Patented Sept. 14, 1937

2,092,936

UNITED STATES PATENT OFFICE 2,092,936

PROCESS OF PREVENTING ACCUMULATION OF PARAFFIN IN OIL WELLS

Thomas O. Smith, San Antonio, Tex., assignor to Sup-R-Treat Laboratories, Incorporated, San Antonio, Tex.

No Drawing. Application October 5, 1936, Serial No. 104,077

8 Claims. (Cl. 166—21)

This invention relates to a process for preventing the accumulation of paraffin in oil wells.

The principal object of the invention is the provision of a composition of matter, the introduction of which into an oil well will effectively maintain the incorporation of the paraffin in the petroleum, and thereby prevent accumulation of paraffin in oil sands at the bottom of the well as well as in pipes, casings and lines.

Another object of the invention is the provision of a composition of such physical and chemical properties that it will form a film on the surfaces of particles of sand, pipes etc., which will effectively prevent the adherence of paraffin to such surfaces.

Another object of the invention is the provision of a treating compound which is not only free from any corrosive effect on any equipment with which it may come in contact, but which will also neutralize acid conditions often encountered, particularly with oils of a relatively high sulphur content.

The reduction in the rate of yield of oil from wells due to paraffin accumulation is well known, and many methods have heretofore been employed to free the wells from such accumulation, such as mechanically removing the deposits with swabs, the use of strongly alkaline solutions, and the application of heat. These methods are costly and many of them have met with but indifferent success, and repetition at periodical intervals is necessary. The purpose of the present invention is the provision of a method for the prevention of such paraffin accumulation, thereby eliminating the necessity of periodically removing the paraffin deposits.

The best results have been obtained by associating the ingredients in the manner and in the proportions set forth but some modification is possible without reducing the effectiveness of the compound or departing from the intent of the invention.

In preparing the composition, 25 gallons of castor oil are sulfonated with 2 gallons of 66° Bé. sulfuric acid and the mixture maintained at an approximate temperature of from 120° F. to 128° F. for a period of about 24 hours. The sulfonated oil is then washed with 5 gallons of water and allowed to stand for from 12 to 18 hours, after which the oil is decanted from the wash water.

To the sulfonated oil prepared as above described, 5 gallons of soap is added which is prepared by saponifying an oil mixture of 75% corn oil and 25% Red oil with a 26° Bé. sodium hydroxide solution.

Five gallons of a 10° Bé. solution of oxalic acid is next added to the mixture of soap and sulfonated oil, and 9 gallons of benzol, in which 5 pounds of naphthalene have been previously dissolved, are then thoroughly incorporated in the soap mixture. Five gallons of a product prepared as follows are next incorporated. Twenty-five gallons of pine oil are sulphonated with 2 gallons of 66° Bé. sulfuric acid and allowed to stand for 24 hours, after which 6 gallons of 26° Bé. sodium hydroxide are added.

Five gallons of red oil (oleic acid) are stirred into the mixture and the entire product is made slightly alkaline with 26% ammonia, and the treating compound is ready for use.

The process of making the above described compound as it is prepared for the trade has been explained in detail, but it is understood that some modification in the technique of manufacture as well as in the ingredients and proportions above set forth is possible within the scope of the present invention. Obviously other fatty acids and oils can be substituted for those above set forth, and toluene, ($C_6H_5CH_3$), xylene, ($C_6H_4(CH_3)_2$) or other aromatic hydrocarbons may be substituted for the benzene ($C_6H_6$). A substitution of anthracene $C_6H_4C_2H_2C_6H_4$ or some other cyclic compound for the naphthalene $C_{10}H_8$ could also be made. The process above described for incorporating the various ingredients is such that a uniform and stable product is obtained.

The treating compound above described may be introduced into oil wells in various ways but it is preferably first mixed with approximately 15 times its volume, with either oil or water, and introduced into the well through a lubricator. It has been found in practice that approximately eight gallons of the treating compound when thus continuously introduced into the well will suffice for a period of from 50 to 60 days before it is necessary to recharge the lubricator.

The compound further possesses the quality of forming a non-corrosive lubricating film on surfaces with which it comes in contact, which effectively prevents adherence of paraffin to particles of sand, as well as pipes, casings and lines.

What is claimed is:—

1. The hereindescribed process for prevention of paraffin accumulation in oil wells which consists in introducing into said wells a composition comprising a mixture of sulfonated vegetable oil, soap, oxalic acid, benzol, naphthalene, sodium hydroxide, a fatty acid, and ammonia.

2. The hereindescribed method for prevention of paraffin accumulation in oil well sands, pipes, casings and lines which consists in introducing into the oil well a mixture of sulfonated castor oil, corn oil soap, oleic acid soap, oxalic acid, benzol, naphthalene, the sodium soap of a sulfonated vegetable oil, a fatty acid, and ammonia.

3. A method for forming a coating on the surface of oil sands, pipes, casings and lines whereby to prevent the adherence of paraffin thereto which consists in introducing into the oil a mixture of sulfonated castor oil, soap, oxalic acid, benzol, naphthalene, an alkaline salt of a sulfonated vegetable oil, and the ammonium soap of a fatty acid.

4. The hereindescribed method for forming a film on surfaces with which petroleum is in contact during its production which includes the introduction into said petroleum of a mixture of sulfonated vegetable oil, soap, an organic acid, benzol, a salt of a sulfonated vegetable oil and ammonium soap.

5. A method for preventing separation of paraffin from petroleum, said method comprising introduction into said petroleum of sulfonated castor oil, sodium soap, oxalic acid, a naphthalene and benzol solution, a sulfonated pine oil soap and the ammonium soap of a fatty acid.

6. In the process of preventing the depositing of paraffin during the production of petroleum, the step of introducing into said petroleum a slightly alkaline compound comprising a mixture of sulfonated castor oil, corn oil soap, oleic acid soap, oxalic acid, benzol, naphthalene, the sodium soap of sulfonated pine oil, and the ammonium soap of oleic acid.

7. A composition for the prevention of paraffin deposits, which includes sulfonated vegetable oil, soap, oxalic acid, a naphthalene and xylene solution, the sodium soap of a sulfonated vegetable oil, and the ammonium soap of a fatty acid.

8. A composition for the prevention of paraffin deposits which includes 25 gallons of sulfonated castor oil, 5 gallons of a mixture of corn oil and oleic acid soaps, 5 gallons of 10° Bé. oxalic acid solution, 5 pounds of naphthalene dissolved in 9 gallons of benzol, 5 gallons of sulfonated pine oil soap, five gallons of oleic acid, and sufficient ammonia solution to render the product slightly alkaline.

THOMAS O. SMITH.